United States Patent
Schlack et al.

(10) Patent No.: US 9,712,412 B2
(45) Date of Patent: Jul. 18, 2017

(54) AGGREGATING STATUS TO BE USED FOR SELECTING A CONTENT DELIVERY NETWORK

(71) Applicants: John A. Schlack, Quakertown, PA (US); Qin Zang, Furlong, PA (US)

(72) Inventors: John A. Schlack, Quakertown, PA (US); Qin Zang, Furlong, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 306 days.

(21) Appl. No.: 13/754,536

(22) Filed: Jan. 30, 2013

(65) Prior Publication Data

US 2014/0215051 A1 Jul. 31, 2014

(51) Int. Cl.
*H04L 12/26* (2006.01)
*H04L 29/08* (2006.01)

(52) U.S. Cl.
CPC ...... *H04L 43/0817* (2013.01); *H04L 67/1008* (2013.01); *H04L 67/1021* (2013.01); *H04L 67/18* (2013.01); *H04L 67/289* (2013.01); *H04L 67/2852* (2013.01); *H04L 43/16* (2013.01)

(58) Field of Classification Search
CPC ..... H04L 43/0817; H04L 43/16; H04L 61/00; H04L 67/00; H04L 45/00
See application file for complete search history.

(56) References Cited

U.S. PATENT DOCUMENTS

| | | | |
|---|---|---|---|
| 7,340,510 B1 * | 3/2008 | Liskov et al. | 709/220 |
| 8,184,549 B2 | 5/2012 | Wiley et al. | |
| 8,194,643 B2 | 6/2012 | Bugenhagen | |
| 8,289,965 B2 | 10/2012 | Bugenhagen et al. | |
| 8,700,945 B1 * | 4/2014 | Allen et al. | 714/4.11 |
| 2009/0157850 A1 * | 6/2009 | Gagliardi et al. | 709/219 |
| 2011/0196943 A1 * | 8/2011 | Bornstein et al. | 709/219 |
| 2012/0072526 A1 * | 3/2012 | Kling | H04L 67/06 709/213 |
| 2012/0246273 A1 * | 9/2012 | Bornstein et al. | 709/217 |
| 2012/0321052 A1 | 12/2012 | Morrill et al. | |
| 2013/0013764 A1 * | 1/2013 | Li et al. | 709/224 |
| 2014/0040412 A1 * | 2/2014 | Yanagihara et al. | 709/213 |
| 2014/0108671 A1 * | 4/2014 | Watson et al. | 709/231 |
| 2014/0149601 A1 * | 5/2014 | Carney | H04L 67/1097 709/238 |
| 2014/0164584 A1 * | 6/2014 | Joe et al. | 709/223 |

* cited by examiner

*Primary Examiner* — Nicholas Taylor
*Assistant Examiner* — Afroza Sultana
(74) *Attorney, Agent, or Firm* — Patent Capital Group (57) ABSTRACT

A method is provided in one example embodiment and includes receiving a request for content from a source in a network; determining a geographic service region for the source; determining a status of a plurality of content delivery networks in the service region. The status is indicative of at least whether each of the plurality of content delivery networks is active or impaired. The method can also include selecting a particular one of the content delivery networks having a corresponding status as active to service the request for content.

19 Claims, 7 Drawing Sheets

| CACHE NODE IP | CURRENT BITRATE | MAX BITRATE | % MEMORY | % CPU | · · · |
|---|---|---|---|---|---|
| 10.101.20.3 | 2.3 Gbps | 10.0 Gbps | 42% | 28% | · · · |
| 10.101.20.4 | 1.9 Gbps | 4.0 Gbps | 68% | 59% | · · · |
| 10.102.20.2 | 0.4 Gbps | 10.0 Gbps | 28% | 5% | · · · |

FIG. 2

| REGION | CDN | CACHE NODE IP | COST (OPTIONAL) |
|---|---|---|---|
| PHILADELPHIA | A | 10.101.20.3 | 1 |
| PHILADELPHIA | A | 10.101.20.4 | 1 |
| PHILADELPHIA | A | 10.101.20.5 | 2 |
| PHILADELPHIA | A | 10.102.20.2 | 5 |
| BOSTON | A | 10.101.20.3 | 5 |
| BOSTON | A | 10.102.20.2 | 1 |
| BOSTON | A | 10.102.20.16 | 1 |
| BOSTON | B | 20.20.106.13 | 2 |
| BOSTON | B | 20.20.106.14 | 1 |

| REGION | CDN | RESOURCE LOAD | RESOURCE MAX | STATUS (%) |
|---|---|---|---|---|
| BOSTON | A | 4.6 Gbps | 20.0 Gbps | 100% |
| BOSTON | B | 7.3 Gbps | 10.0 Gbps | 100% |
| PHILADELPHIA | A | 6.9 Gbps | 16.0 Gbps | 80% |
| PHILADELPHIA | B | 0.0 Gbps | 0.0 Gbps | 0% |

FIG. 5

| DATA CENTER | LATITUDE | LONGITUDE | CACHE NODE IP LIST |
|---|---|---|---|
| dc.1operator.com | 39.9522°N | 75.1642°W | 10.101.20.3<br>10.101.20.4<br>10.101.20.5 |
| dc.2operator.com | 42.3583°N | 71.0603°W | 10.101.20.1<br>10.101.20.2 |

| DATA CENTER | DISTANCE | RESOURCE LOAD | RESOURCE MAX | STATUS (%) |
|---|---|---|---|---|
| CDN B WASHINGTON DC | 306km | 0.0Gbps | 0.0 Gbps | 0% |
| CDN A PHILADELPHIA | 413km | 4.6 Gbps | 20.0 Gbps | 100% |
| CDN A BOSTON | 774km | 7.3 Gbps | 10.0 Gbps | 100% |
| CDN B BOSTON | 781km | 6.9 Gbps | 16.0 Gbps | 80% |

| DATA CENTER | CDN | SUBNET |
|---|---|---|
| PHILADELPHIA | A | 10.101.20.0/8 |
| PHILADELPHIA | A | 10.101.27.0/8 |
| BOSTON | A | 10.102.0.0/16 |
| BOSTON | B | 20.20.106.0/8 |

AGGREGATING STATUS TO BE USED FOR SELECTING A CONTENT DELIVERY NETWORK

TECHNICAL FIELD

This disclosure relates in general to the field of communications, and more particularly, to selecting a content delivery network based on aggregating status.

BACKGROUND

End users have more media and communications choices than ever before. A number of prominent technological trends are currently afoot (e.g., more computing devices, more online video services, more Internet traffic), and these trends are changing the media delivery landscape. Content delivery networks (CDNs) serve a large fraction of the Internet content today, including web objects (text, graphics, Uniform Resource Locators (URLs) and scripts), downloadable objects (media files, software, documents), applications (e-commerce, portals), live streaming media, on demand streaming media, and social networks. In a multi-CDN network, a CDN selector can be used for performing client request routing. However, determining the proper CDN network to route traffic can be problematic.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a request for content from a source in a network. The content can include any data suitable for propagation in a network (e.g., text, video, audio, media, etc.). The method also includes determining a geographic service region for the source. The term 'geographic service region' includes any boundary, perimeter, border designation, edge demarcation, designated area, service provider domain, coverage area, city boundaries, county boundaries, longitude and latitude metrics, etc. associated with providing any type of network service. The method also includes determining a status of a plurality of content delivery networks in the service region. The status is indicative of at least whether each of the plurality of content delivery networks is active (e.g., operational, functional, capable of tolerating an increased load, in service, etc.) or impaired (e.g., compromised, damaged, non-operational, malfunctioning, inoperative, unresponsive, out of date, non-compliant, etc.). The method can also include selecting a particular one of the content delivery networks having a corresponding status as active to service the request for content. Servicing the request in such a context includes any activity associated with providing a response to the initiated request.

In more particular embodiments, the method can include creating a list from the plurality of content delivery networks in the service region; and removing impaired content delivery networks from the list. In other examples, the method can include determining a location of the source using a location service module, where the service region is determined based, at least in part, on the location of the source. The method could also include determining a network path for accessing the content using a network proximity service module. A specific one of the plurality of content delivery networks can be determined to be impaired if one or more cache nodes associated with the specific content delivery network in the service region is operating below a predetermined threshold. The threshold could be associated with a maximum resource load, a minimum resource maximum capability, a current bit rate, a max bit rate, or any other suitable network metric.

Example Embodiments

Figure 1:
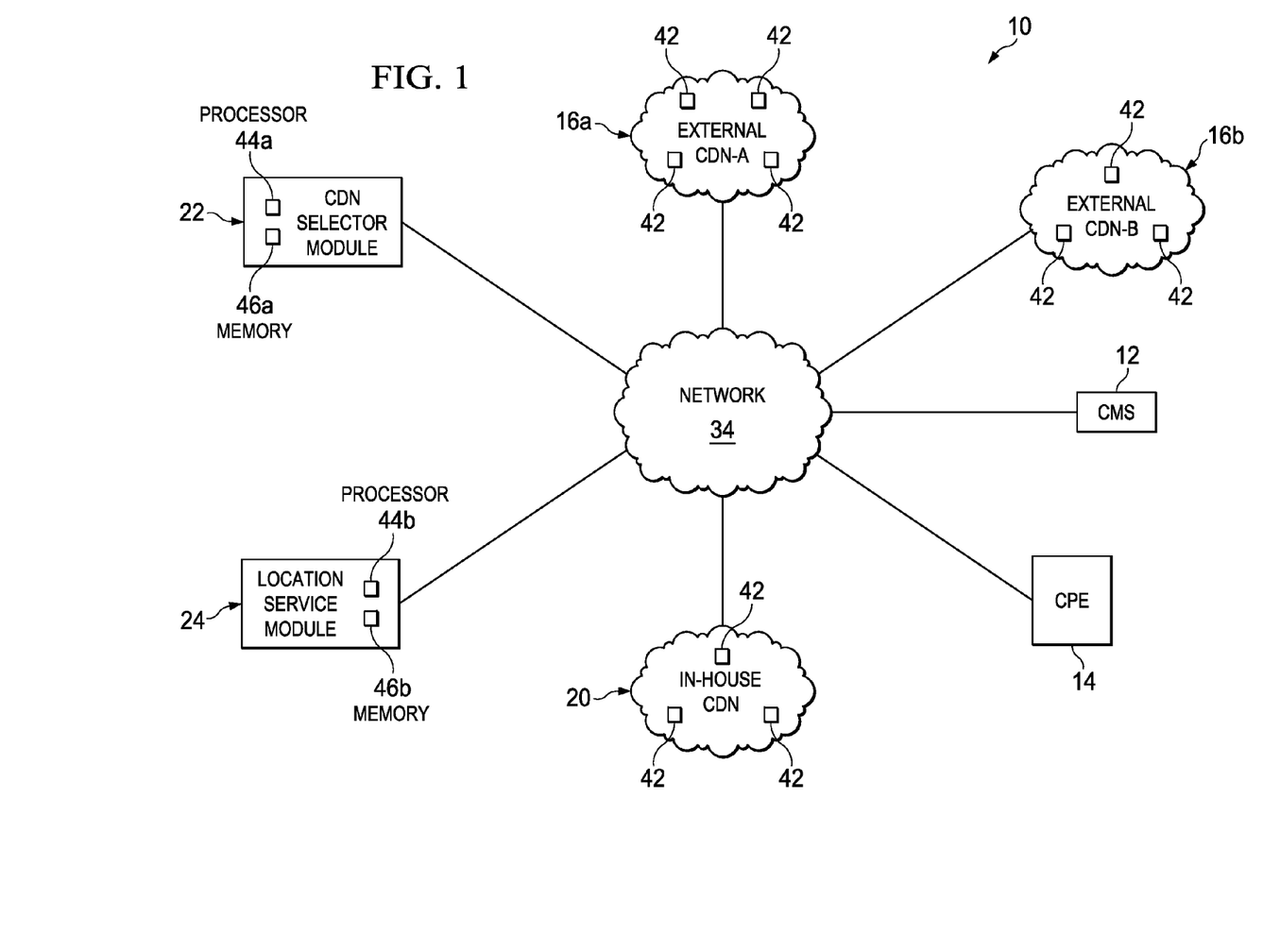
FIG. 1 is a simplified block diagram illustrating an example embodiment of a communication system in accordance with one embodiment of the present disclosure.

Turning to FIG. 1, FIG. 1 is a simplified block diagram of a communication system 10 configured for selecting a content delivery network (CDN) in accordance with one embodiment of the present disclosure. Communication system 10 includes a content management server (CMS) 12 (which may also include a suitable portal), an instance of customer premise equipment (CPE) 14, a plurality of external CDNs 16a and 16b, an in-house CDN 20, a CDN selector module 22, a location service module 24, and a network 34. CDN selector module 22 includes a processor 44a and a memory 46a. Location service module 24 may include a processor 44b and a memory 46b. External CDNs 16a and 16b and in-house CDN 20 may each include a plurality of cache nodes 42.

In general terms, each cache node 42 is a cache on a nonterminal node. Each cache node can fill with (or cache) the data that passes through the node such that data can be read from the cache rather than from a data source. CMS 12 may be configured to allow publishing, editing, and/or modifying of content, as well as to provide suitable maintenance from a central interface. In one example, CMS 12 can be configured to create, manage, store, and deploy content (e.g., text and embedded graphics, photos, video, audio, code (e.g., for applications), etc.) on Web pages.

External CDNs 16a and 16b and in-house CDN 20 are each a CDN in a particular embodiment of the present disclosure. In general terms, a CDN is a distributed system of servers, computers, and/or network elements (e.g., gateways, routers, switches, caches, etc.) deployed in multiple data centers in a service provider's network, or on the Internet. The typical goal of a CDN is to serve content to end users with high availability and high performance. CDNs serve a large portion of the content on the Internet today, including web objects (text, graphics, URLs, and scripts), downloadable objects (media files, software, documents, etc.), applications (e-commerce, portals), live-streaming media, on-demand streaming media, and social networks. A CDN may include cache nodes (e.g., cache nodes 42) that are usually deployed in multiple locations, often over multiple backbones.

CDN selector module 22 can be configured to perform CPE 14 request routing in a multi-CDN environment. The request routing can be based on service provider specified logic or rules with the goal of providing a quality user experience with a minimum cost to serve the content. The logic or rules may specify a number of criteria including (but are not limited to) device (e.g., CPE 14) location, CDN coverage area, CDN status and resource availability, delivery service, content metadata, device (e.g., CPE 14) type, etc.

Service provider requirements put a high value on the use of CDN status as a primary input in the determination of which CDN to select. However, a CDN typically presents a resource usage and status view of individual cache nodes, or provides an aggregated view of the status of the entire CDN. This is not sufficient for CDN selector module 22 to properly select a CDN for individual requests. Communication system 10 can be configured to determine the load and status of a given CDN on a regional and individual request basis so that this load and status can be properly applied when selecting a CDN for individual requests. In one example implementation, status and resource usage from individual cache nodes from a set of CDNs may be collected and used to determine which CDN is available for use for a particular CPE 14 request.

For purposes of illustrating certain example techniques of communication system 10, it is important to understand the communications that may be traversing the network. The following foundational information may be viewed as a basis from which the present disclosure may be properly explained. CDNs (e.g., external CDNs 16a and 16b and in-house CDN 20) typically report status and resource usage by individual cache nodes (e.g., cache nodes 42), or provide an aggregate that is either an average or a worst-case view. However, the status of individual cache nodes does not properly indicate whether a given CDN is capable of serving content to a particular client device (e.g., CPE 14). Multiple cache nodes in each CDN may be capable of handling a given client device request. A small number of overloaded or failed cache nodes within a CDN may affect some client devices, but not other client devices. If all cache nodes serving a given region are impaired, but the majority of cache nodes in the CDN are operational, CDN selector module 22 may erroneously select that CDN to serve a client device in the region that is impaired. It is also not sufficient to view the status on an overall CDN level because overloaded or failed devices may be the only cache nodes within reasonable proximity of a client device.

Thus, on an aggregate level, the CDN status may be acceptable, but the CDN may still not be capable of handling particular client device requests. Because the viewing status of cache nodes is based on service regions, CDN selector module 22 can view the status of the cache nodes that will actually service the client device and thus be able to exclude CDNs from selection if there is a regional outage. More specifically, communication system 10 can be configured to define service regions (either explicitly or implicitly) and aggregate status based on those service regions.

Service regions may be geographically based, or related to network proximity. When a client device requests content, the service region of the client device is determined using location service module 24. CDN selector module 22 can then examine the status of each CDN based on the aggregate status for that service region. As long as the cache nodes for that service region are operational, the CDN is a candidate for selection to deliver the content. If the cache nodes for that service region for a particular CDN are impaired, then that CDN is not a candidate for selection.

In accordance with one example implementation of the present disclosure, communication system 10 can resolve the aforementioned issues (and potentially others) associated with selecting a CDN. In one example implementation, CDN selector module 22 is configured to obtain CDN status from each of the CDNs used by the service provider. CDN selector module 22 may pull the CDN status, or the CDN may push the status to CDN selector module 22. The status can be obtained on demand, periodically, or when a significant event (such as device failure) occurs. The CDN status information typically specifies the resource load and availability of each cache node.

CMS 12 can provide navigation and entitlement services. CPE 14 accesses CMS 12 to search and browse the content offerings to be viewed on CPE 14. CMS 12 verifies that CPE 14 is entitled to the content and may return a URL (or content reference, reference ID, etc.) that will allow access to the content. In this particular example, the URL does not resolve to a particular CDN since multiple CDNs are capable of delivering the content. Instead, either explicitly or implicitly, the URL would direct CPE 14 to CDN selector module 22.

CPE 14 uses the URL (or content reference, reference ID, etc.) to request the content. This request is routed to CDN selector module 22. CDN selector module 22 uses configured logic or rules for selecting a CDN and CDN status information that it has collected to select a CDN to deliver content to CPE 14. The configured logic or rules may include device (e.g., CPE 14) location, CDN coverage area, CDN status and resource availability, delivery service, content metadata, device (e.g., CPE 14) type, etc. Note that CDN selector module 22 may use location service module 24 to determine the location of CPE 14. CDN selector module 22 then directs CPE 14 to the selected CDN. This can occur using DNS, HTTP GET/Redirect, a web service/remote procedure call, etc. CPE 14 then pulls the content from the selected CDN.

Note that in alternate (but similar) architectures, CMS 12 may query CDN selector module 22 directly to select a CDN and return a URL for the requested content to the selected CDN. Thus, CPE 14 may directly communicate with CDN selector module 22 or may be proxied by another device, such as another CMS or a session manager.

Turning to the example infrastructure associated with present disclosure, CPE 14 can be associated with devices, customers, or end users wishing to receive data or content in communication system 10 via some network. The term 'customer premise equipment' is inclusive of devices used to initiate a communication, such as a receiver, a computer, a set-top box, an Internet radio device (IRD), a cell phone, a smart phone, a tablet, a personal digital assistant (PDA), a Google Droid™, an iPhone™, an iPad™, or any other device, component, element, or object capable of initiating voice, audio, video, media, or data exchanges within communication system 10. CPE 14 may also be inclusive of a suitable interface to a human user, such as a display, a keyboard, a touchpad, a remote control, or other terminal equipment. CPE 14 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Network 34 represents a series of points or nodes of interconnected communication paths for receiving and transmitting packets of information that propagate through communication system 10. Network 34 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/WiMAX environments. The architecture of the present disclosure may include a configuration capable of transmission control protocol/internet protocol (TCP/IP) communications for the transmission and/or reception of packets in a network.

CDN selector module 22 and location service module 24 are network elements that can facilitate the selecting of a CDN as discussed herein. As used herein in this Specification, the term 'network element' is meant to encompass any of the aforementioned endpoints, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, CDN selector module 22 and/or location service module 24 may include software to achieve (or to foster) activities associated with selecting a CDN, as discussed herein. Additionally, each element can have an internal structure (e.g., a processor, a memory element, etc.) to facilitate some of the operations described herein. In other embodiments, the selection of a CDN may be executed externally to these elements, or included in some other network element to achieve the intended functionality. Alternatively, CDN selector module 22 and/or location service module 24 may include software (or reciprocating software) that can coordinate with other network elements in order to achieve the support of selecting a CDN as described herein. In still other embodiments, one or several devices may include any suitable algorithms, hardware, software, components, modules, interfaces, or objects that facilitate the operations thereof.

Figure 2:
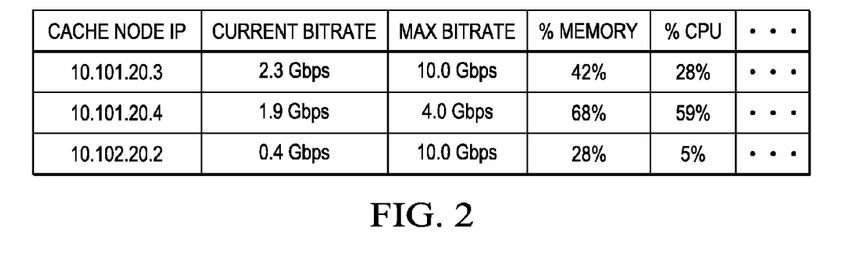
FIG. 2 is a simplified table illustrating possible example details associated with one embodiment of the present disclosure.

Turning to FIG. 2, FIG. 2 is a simplified table illustrating one possible set of example CDN status data details associated with communication system 10. CDNs are typically setup to report status of individual cache nodes within a CDN to a network operations center (NOC). This allows the NOC to take action in response to network and device failures. The status data is typically reported using either a web services interface or simple network management protocol (SNMP) interface. A CDN may send a notification to the NOC when a particular event occurs, such as component failure, out of resources, etc. The NOC may poll the status of the cache nodes either periodically or in response to event notifications.

Example data reported by the cache nodes within a CDN include current and maximum streaming bit rate, memory utilization, percent of computer processing unit (CPU) utilization, and operational status (such as operational, out of service, or failed). Additionally, lack of reporting of status information by a particular cache node also provides an indication of either a network or device failure. For example, FIG. 2 illustrates a current bitrate, max bitrate, percent of memory usage, and percent of CPU usage for three cache nodes identified by their IP address.

CDN selector module 22 can leverage the status information in order to determine the ability of a CDN to handle a particular request. CDN selector module 22 collects status using the same mechanism as the NOC. Thus, it may use web services or SNMP (or other similar protocols). Since CDN selector module 22 can choose among multiple CDNs, CDN selector module 22 can collect the status from all the cache nodes in each CDN that is used by a service provider associated with CPE 14.

However, the status is reported by individual cache node. Multiple cache nodes in each CDN may be capable of handling a given CPE 14 request. A small number of overloaded or failed cache nodes within a CDN may impact some requests, but not other requests (for example, a request from a different CPE in a different region that does not contain overloaded or failed cache nodes). Thus, it is not sufficient to examine CDN status on an individual cache node level. It is also not sufficient to view the status on an overall CDN level. It may be that overloaded or failed devices are the only ones within reasonable proximity of CPE 14. Thus, on an aggregate level, the CDN status may be acceptable, but the CDN may still not be capable of handling particular CPE 14 requests. CDN selector module 22 can be configured to aggregate the status data and use the status reported by the cache nodes to determine whether a particular CDN is capable of handling particular CPE 14 requests.

Figure 3:
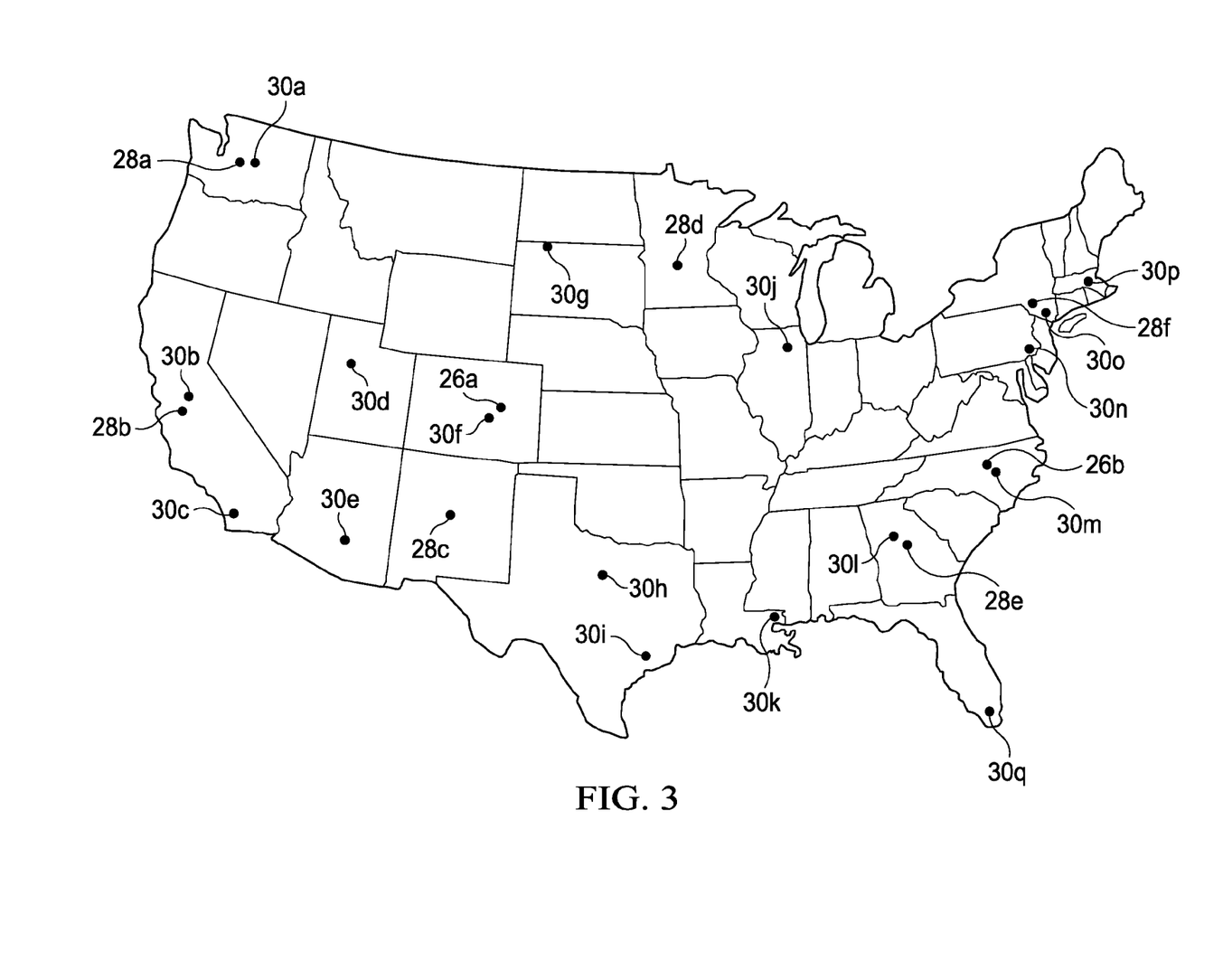
FIG. 3 is a simplified diagram illustrating possible example details associated with one embodiment of the present disclosure.

Turning to FIG. 3, FIG. 3 is a simplified illustration of an example CDN (e.g., external CDN 16a) with the cache nodes (e.g., cache nodes 42) in the CDN distributed throughout a service region (e.g., the United States). The CDN illustrated in FIG. 3 includes origin servers 26a and 26b, mid-tier cache servers 28a-f, and edge cache servers 30a-p. As used herein, the term "cache node(s)" includes origin servers 26a and 26b, mid-tier cache servers 28a-f, and edge cache servers 30a-p. The example CDN of FIG. 3 is merely an example, and does not limit the scope of the claims. For example, the number of cache nodes may vary, the placement of the cache nodes may vary, and/or the like. The regional distribution of cache nodes allows the CDN to efficiently service requests and minimize distribution costs. When a CDN delivers content to CPE 14, it typically uses a cache node that is proximate to CPE 14.

Typically, one or more edge cache servers 30a-p in proximity to CPE 14 are used to deliver the content to CPE 14. When using multiple CDNs for content delivery, it is likely that some or all of the CDNs service overlapping regions. This provides redundant coverage. If a particular CDN has an outage in a particular region, and CDN with overlapping coverage can be selected by CDN selector module 22 to service the particular region.

CDN selector module 22 can aggregate the cache node status by region and build a model of the operational status of each CDN by region. By determining the location of CPE 14, CDN selector module 22 can use the aggregated status of the cache nodes in that region to determine the CDNs that are currently available to service a request from CPE 14.

The service provider may carve up the coverage area into a set of regions. These regions may be defined in a number of ways, such as geographic regions denoted by polygons with vertices at specific latitude/longitude coordinates, states or provinces, metropolitan areas, etc. For example, the service provider may define the regions to align with state boundaries, zip codes, area codes, a group of polygons, the 210 Nielsen Designated Market Areas (DMAs), etc. The service provider then identifies the cache nodes from each CDN that are capable of servicing each of the defined regions.

Figure 4:
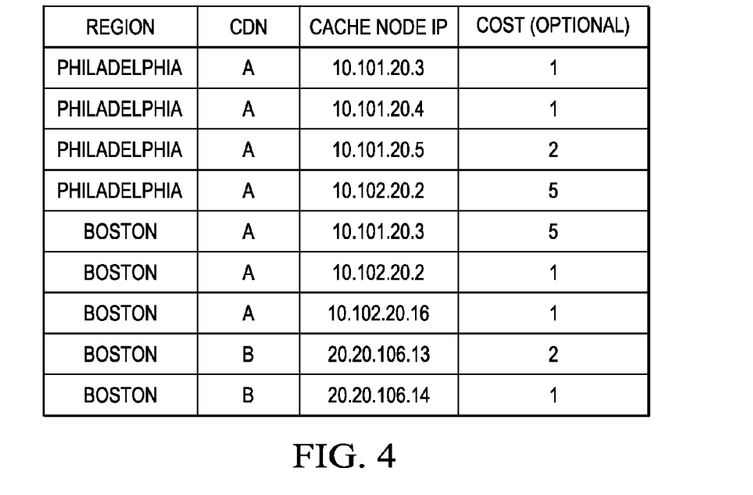
FIG. 4 is a simplified table illustrating possible example details associated with one embodiment of the present disclosure.

Turning to FIG. 4, FIG. 4 is a simplified table illustration of example CDN (e.g., external CDN 16a) status data details associated with communication system 10. For example, FIG. 4 illustrates two CDNs, CDN A (e.g., CDN 16a) and CDN B (e.g., CDN 16b). Each cache node may service a single region or multiple regions. Multiple cache nodes may service the same region. For example, as shown, CDN A has cache nodes distributed in the Boston and Philadelphia region and CDN B has cache nodes distributed in the Boston region. In an embodiment, a cost or other indicator may be assigned to indicate whether particular cache nodes are preferred over others for a specific CDN. Notice that some cache nodes service multiple regions. For example, the cache nodes identified by the IP address 10.101.20.3 and 10.102.20.2 serve both Boston and Philadelphia. Some CDNs might not service all regions, for example, CDN B does not service the Philadelphia region.

When CDN selector module 22 receives status data from individual cache nodes, it can use data (similar to what is shown in FIG. 4) to determine the aggregate CDN status for a particular region for each CDN. Thus, using data (similar to what is illustrated in FIG. 2) CDN selector module 22 can determine the number of available and failed cache nodes in each region for each CDN. CDN selector module 22 can also determine the overall remaining capacity based on the reported load and resource usage.

For example, knowing that CDN A services the Philadelphia region and because the resource load information for each cache node in the Philadelphia region is known (using data similar to what is illustrated in FIG. 2), then CDN A would be serving, for example, 4.6 Gbps (the current bit rate shown in FIG. 2) of a possible 24 Gbps (the max bit rate shown in FIG. 2) maximum load for that region. Since no cache node in CDN A is overloaded and there is available capacity, CDN A is available to service requests for CPEs in that region. In an embodiment, CDN selector module 22 can maintain an aggregated status by region for each CDN. Each time CDN selector module 22 receives status information for an individual cache node, CDN selector module 22 can recalculate the resource load and status for each region serviced by that CDN.

Figure 5:
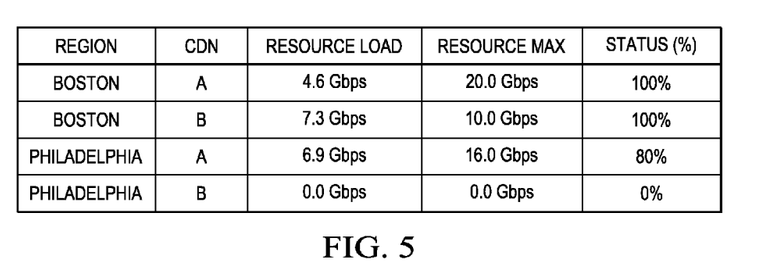
FIG. 5 is a simplified table illustrating possible example details associated with one embodiment of the present disclosure.

Turning to FIG. 5, FIG. 5 is a simplified table illustrating one possible set of example CDN status data details associated with communication system 10. FIG. 5 illustrates an example of the aggregated status for each CDN by region. The status (%) column indicates the percentage of cache nodes that are operational in that region. Note that, CDN B has no operational cache nodes or capacity in the Philadelphia region. That may be due to a service failure or lack of service.

When CDN selector module 22 receives a content request for a particular CPE, CDN selector module 22 determines the region where the CPE is located. Once the region has been determined, CDN selector module 22 uses the aggregate status for that region to determine which CDNs are available to service the request. After eliminating unavailable CDNs, CDN selector module 22 uses configured logic or rules to select the CDN to service the request.

CDN selector module 22 may use cost when determining CDN status. Cache nodes with a higher cost may contribute less to the CDN status. Alternatively, the cost of the aggregated status may be the lowest cost cache node for that region that is operational, and CDN selector module 22 may always select the lowest cost cache node. If so, then once the lowest cost cache nodes are loaded, the cost of that region will increase, as the only cache nodes available for use will be higher cost cache nodes.

Figure 6:
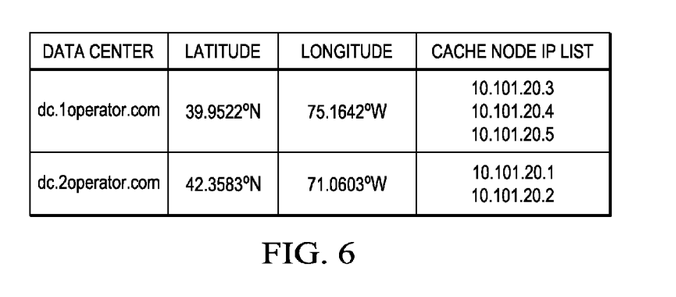
FIG. 6 is a simplified table illustrating possible example details associated with the communication system in accordance with one embodiment of the present disclosure.

Turning to FIG. 6, FIG. 6 is a simplified table illustration of example CDN (e.g., external CDN 16a) location data details associated with communication system 10. For example, cache nodes with an IP address of 10.101.20.3, 10.101.20.4, and 10.101.20.5 are located at the dc1.operator.com data center (e.g., edge cache server 30n) and that data center is located at 39.9522 north latitude and 75.1642 west longitude. Cache nodes with an IP address of 10.101.20.1 and 10.101.20.2 are located at the dc2.operator.com data center (e.g., edge cache server 30p) and that data center is located at 42.3583 north latitude and 71.0603 west longitude.

CDN status can be aggregated by physical location of the cache nodes. Instead of defining service regions, the physical location of each cache node may be configured. The operator may manually configure the latitude/longitude of a data center housing each cache node. When a CDN status update is received by CDN selector module 22, the status for all the cache nodes in the same data center can be aggregated. For example, FIG. 3 shows the physical locations of each edge cache servers 30a-p, mid-tier cache servers 28a-f, and origin servers 26a and 26b. Each location may contain one or more actual servers and one or more cache nodes. Each location can be uniquely identified by a latitude/longitude value.

Alternatively, the location of the cache nodes can be determined using an IP subnet to location mapping table. For example, location service module 24 may contain IP subnet to location data mapping. This may come from the service provider or from a third party (e.g., MaxMind or Quova). CDN selector module 22 can query location service module 24 using the IP address of each cache node to automatically determine the location of the cache node and build a specified physical location to cache node mapping table (similar to the one illustrated in FIG. 6). Given the configured cache node to location mapping data, CDN selector module 22 can aggregate the status of the cache nodes at each location as described above.

When CDN selector module 22 receives a content request from a particular CPE (e.g., CPE 14), CDN selector module 22 can communicate with location service module 24 to determine the latitude/longitude of the client device. Again, this can be based on data from the service provider or a third party (e.g. MaxMind or Quova). Since the physical location of the CPE and all data centers are known, CDN selector module 22 can determine the physical distance between the CPE location and the data centers associated with each CDN. For example, algorithms such as the Haversine formula, Vincenty inverse formula, etc. may be used to calculate the distance between two coordinates on the Earth.

Figure 7:
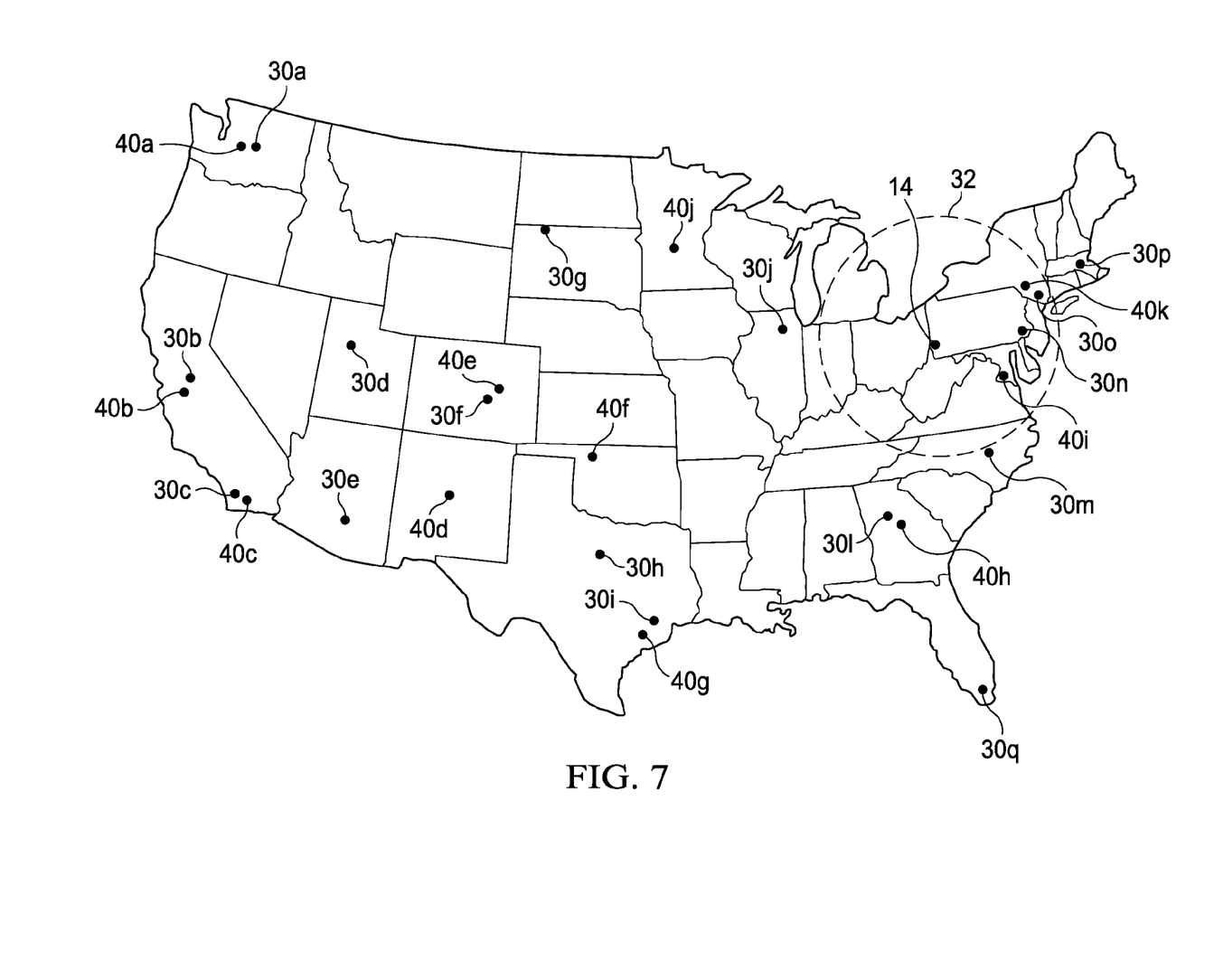
FIG. 7 is a simplified diagram illustrating possible example details associated with one embodiment of the present disclosure.

Turning to FIG. 7, FIG. 7 is a simplified illustration of two example CDNs (e.g., external CDNs 16a and 16b) with the edge cache servers for each CDN distributed throughout a service region (e.g., the United States). Edge cache servers 30a-p may be associated with external CDN 16a and CDN B edge cache servers 40a-k may be associated with external CDN 16b. Also illustrated in FIG. 7, is the location of CPE 14. The physically closest edge cache locations are shown within a circle 32 whose center is CPE 14. CDN selector module 22 uses the status of the cache node locations inside circle 32 to determine the CDN to serve the content. If none of the cache node locations closest to CPE 14 are operational, CDN selector module 22 can expand its search (e.g., increase the size of circle 32) to the next set of cache node locations physically closest to CPE 14.

Determining the physical location of CPE 14 in a particular region may be accomplished using a number of methods. For example, location service module 24 may provide the needed location information, a subscriber or device (e.g., CPE 14) database may provide the needed location information, a location service containing an IP to location database (e.g. MaxMind and Quova) can determine a device location at the scale of a city or metropolitan area, cell tower triangulation can specify the location of a mobile device in latitude/longitude, which can be mapped to geographic regions such as states and metropolitan areas, etc.

Figure 8:
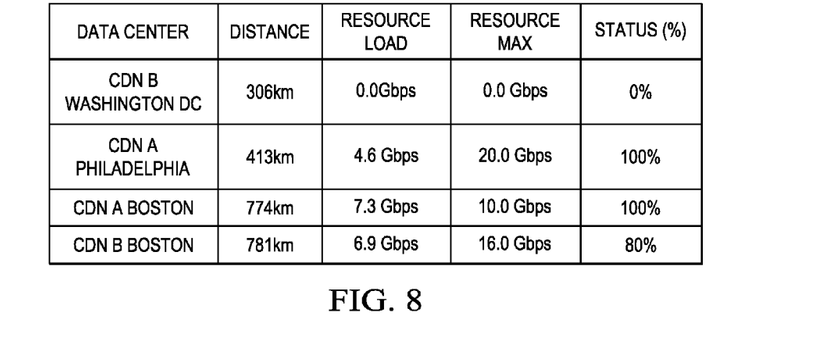
FIG. 8 is a simplified table illustrating possible example details associated with one embodiment of the present disclosure.

Turning to FIG. 8, FIG. 8 is a simplified table illustration of example two CDNs (e.g., external CDN 16a and 16b) location data details associated with communication system 10. For example, as shown, a data center (including edge cache servers 30o illustrated in FIG. 7) associated with the CDN A (e.g., external CDN 16a) in Philadelphia is located 413 kilometers (km) from CPE 14, has a resource load of 4.6 Gbps, a resource max of 20.0 Gbps, and a 100% status. CDN selector module 22 can sort the data center distances in ascending order and then remove data centers whose aggregated status indicates the data center is not operational. For example, a data center (including CDN edge cache server 40i illustrated in FIG. 7) associated with the CDN B (e.g., external CDN 16b) in Washington D.C. is located 306 km from CPE 14 but has a resource load of 0 Gbps, a resource max of 0 Gbps, and a 0% status. [Note that although a given edge cache location may be physically closest to the client device, it may not be an efficient choice from a networking perspective.] For example, because CDN B data center located in Washington D.C. is not operational, the CDN selector module 22 may select CDN A data center located in Philadelphia, which is the closest operational set of edge caches.

Figure 9:
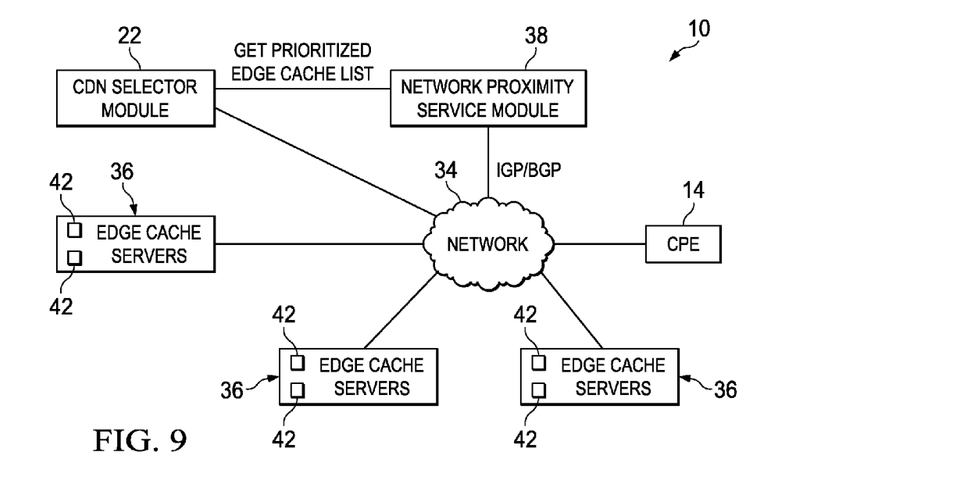
FIG. 9 is a simplified block diagram illustrating an example embodiment of the communication system in accordance with one embodiment of the present disclosure.

Turning to FIG. 9, FIG. 9 is a simplified block diagram of a communication system 10 configured for selecting a CDN in accordance with one embodiment of the present disclosure. Communication system 10 may include CPE 14, CDN selector module 22, network 34, a plurality of edge cache servers 36, and network proximity service module 38. Edge cache servers 36 each include a plurality of cache nodes 42.

Network proximity service module 38 can determine an efficient network path between CPE 14 and a specific edge cache device 36 that contains one or more cache nodes 42. Network proximity service module 38 may use underlying routing protocols, such as Open Shortest Path First (OSPF), Interior Gateway Protocol (IGP), Border Gateway Protocol (BGP), etc. to determine the topology of network 34, number of network hops between CPE 14 and each edge cache server, and the status of the network links. The IP address of CPE 14 and each edge cache device may be used to determine the network proximity.

Network proximity service module 38 can be configured to manage the network topology and status information and may implement a standardized protocol such as Internet Engineering Task Force (IETF) Application-Layer Traffic Optimization (ALTO) to return a prioritized list of edge cache device IP addresses for a given CPE 14 IP address. Also, network proximity service module 38 can use networking protocols (e.g. OSPF, IGP, BGP, etc.) to update and maintain the delivery network topology map and status and can implement an interface that allows CDN selector 22 to provide a CPE 14 network location (e.g. IP address, subnet, etc.) and a set of edge cache network locations (that include one or more cache nodes 42) as input. In addition, network proximity service module 38 can return the list of edge cache network locations sorted based on the efficient network path. In one illustrative example, the first entry in the list may represent one of the most efficient edge cache network locations (from a network path perspective) to use to deliver content.

For example, CDN selector module 22 may specify the following information in the request:
CPE 14 Network Location: 102.4.23.0/8
Edge Cache Network Locations: 116.104.0.0/16
109.43.12.0/8
77.200.50.0/12
78.21.1.0/8

Network proximity service module 38 may return the following response:
Sorted Edge Cache Locations: 109.43.12.0/8
116.104.0.0/16
78.21.1.0/8
77.200.50.0/12

Thus, the edge cache(s) in subnet 109.43.12.0/8 have one of the most efficient network paths to the client device, which is on the 102.4.23.0/8 subnet. CDN selector module 22 makes use of network proximity service module 38 by using network proximity service module 38 to create an ordered list of the edge caches that have an efficient network path to CPE 14. Once an ordered list of edge caches has been obtained, CDN selector module 22 examines the CDN status (by examining the status of each cache node 42) for each edge cache and removes those CDNs that are impaired.

Figure 10:
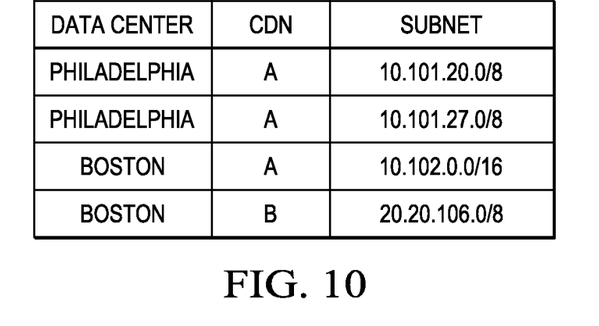
FIG. 10 is a simplified table illustrating potential operations associated with the communication system in accordance with one embodiment of the present disclosure.

Turning to FIG. 10, FIG. 10 is a simplified table illustration of two CDNs (e.g., external CDN 16a and 16b) location data details associated with communication system 10. For example, CDN 16a may have data centers in Philadelphia and Boston. CDN 16b may have a data center in Boston. In an embodiment, network proximity service module 38 allows specification of network location in a generic fashion. CDN selector module 22 may obtain an ordered list of individual edge caches or an ordered list of edge caches by subnet (or set of subnets, e.g. data center). If CDN selector module 22 obtains the ordered list by subnet (or set of subnets), CDN selector module 22 may then also aggregates edge cache status by subnet. CDN selector module 22 may aggregate the edge cache status by subnet or by data center. Thus, the status for all edge caches in subnets 10.101.20.0/8 and 10.101.27.0/8 will be aggregated since both of these subnets are part of CDN A and reside in the same data center.

Figure 11:
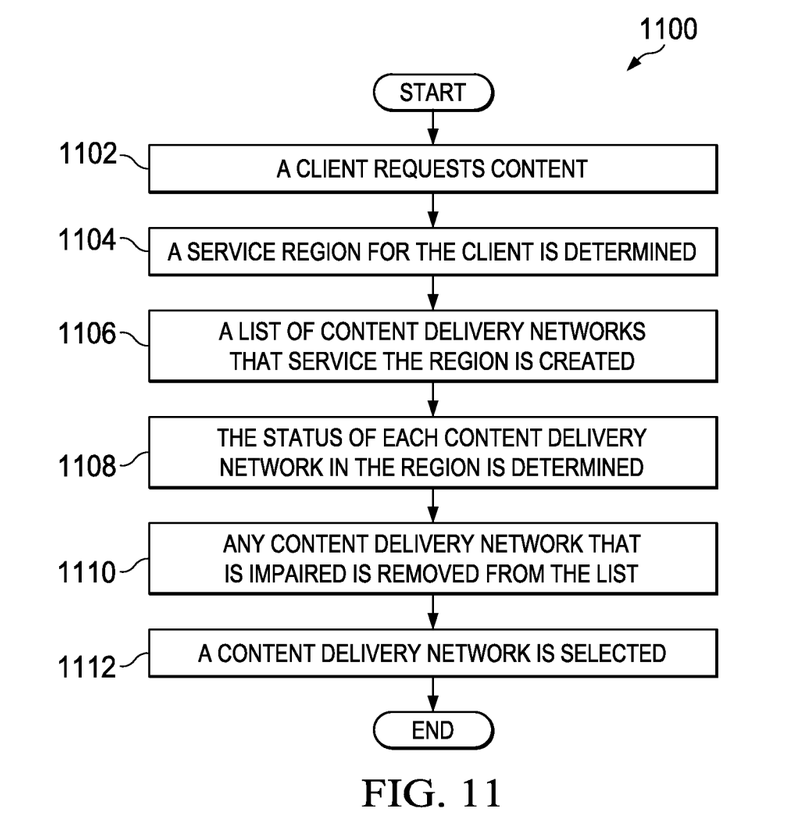
FIG. 11 is a simplified flowchart illustrating one possible set of activities associated with the communication system.

Turning to FIG. 11, FIG. 11 is a simplified flowchart 1100 illustrating example activities associated with supporting different uniform resource locator formats for the same content on different network elements. At 1102, a client (e.g., CPE 14) requests content. At 1104, a service region for the client is determined. At 1106, a list of CDNs that service the region is created. At 1108, the status of each CDN in the region is determined. At 1110, any CDN that is impaired is removed from the list. For example, A CDN may be considered impaired if one or more cache nodes associated with the CDN is operating below a threshold. The threshold may include a maximum resource load, minimum resource maximum capability, current bit rate, max bit rate, etc. At 1112, a content delivery network is selected.

As identified previously, a network element can include software (e.g., CDN selector module 22, location service module 24, network proximity service module 38, etc.) to achieve selecting a CDN, as outlined herein in this document. In certain example implementations, the functions for selecting a CDN as outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processors 44a and 44b shown in FIG. 1], or other similar machine, etc.).

In some of these instances, a memory element [memory 46a and 46b shown in FIG. 1] can store data used for the operations described herein. This includes the memory element being able to store instructions (e.g., software, code, etc.) that are executed to carry out the activities described in this Specification. The processor (e.g., processors 44a and 44b) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in supporting the selection of a CDN, as outlined herein. Additionally, each of these devices may include a processor that can execute software or an algorithm to perform the activities of selecting a CDN as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a request for content to be delivered to a source in a network;
   determining a geographic service region for the source;
   creating a list of a plurality of content delivery networks in the geographic service region;
   determining the plurality of content delivery networks that each have a plurality of service cache nodes in the geographic service region, wherein each of the service cache nodes are configured to deliver the requested content, wherein at least one of the plurality of content delivery networks has more than one service cache node in another geographic service region, wherein at least one of the plurality of content delivery networks includes one or more service cache nodes that are not configured to deliver the requested content;
   determining a status of each of the plurality of content delivery networks, wherein the status is based, at least in part, on an aggregate status of the content delivery network for the service region and a use cost of the content delivery network for the service region;
   removing impaired content delivery networks from the list;
   determining a status of each service cache node for each plurality of content delivery networks in the service region, wherein the status is provided by the content delivery network associated with the status, wherein the status indicates a resource load and availability of each service cache node, wherein the status is indicative of at least whether the service cache node is active or impaired; and
   selecting a particular one of the content delivery networks having a corresponding status as active to service the request for content.

2. The method of claim 1, further comprising:
   determining a location of the source using a location service module, wherein the service region is determined based, at least in part, on the location of the source.

3. The method of claim 1, further comprising:
   determining a network path for accessing the content using a network proximity service module.

4. The method of claim 1, wherein a specific one of the plurality of content delivery networks is determined to be impaired if one or more cache nodes associated with the specific content delivery network in the service region is operating below a predetermined threshold, wherein the threshold is associated with a maximum resource load, a minimum resource maximum capability, a current bit rate, or a max bit rate.

5. The method of claim 1, wherein determining the status of the plurality of content delivery networks includes determining an overall remaining capacity for at least one of the plurality of content delivery networks for the service region.

6. One or more non-transitory media that includes instructions for execution and when executed by a processor is operable to perform operations, comprising:
   receiving a request for content from a source in a network;
   determining a geographic service region for the source;
   creating a list of a plurality of content delivery networks in the geographic service region;
   determining the plurality of content delivery networks that each have a plurality of service nodes in the geographic service region, wherein each of the service cache nodes are configured to deliver the requested content, wherein at least one of the plurality of content delivery networks has more than one service cache node in another geographic service region, wherein at least one of the plurality of content delivery networks includes one or more service cache nodes that are not configured to deliver the requested content;
   determining a status of each of the plurality of content delivery networks, wherein the status is based, at least in part, on an aggregate status of the content delivery network for the service region and a use cost of the content delivery network for the service region;
   removing impaired content delivery networks from the list;
   determining a status of each service node for each plurality of content delivery networks in the service region, wherein the status is provided by the content delivery network associated with the status, wherein the status indicates a resource load and availability of each service cache node, wherein the status is indicative of at least whether the service node is active or impaired; and
   selecting a particular one of the content delivery networks having a corresponding status as active to service the request for content.

7. The media of claim 6, the operations further comprising:
   determining a location of the source using a location service module, wherein the service region is determined based, at least in part, on the location of the source.

8. The media of claim 6, the operations further comprising:
   determining a network path for accessing the content using a network proximity service module.

9. The media of claim 6, wherein a specific one of the plurality of content delivery networks is determined to be impaired if one or more cache nodes associated with the specific content delivery network in the service region is operating below a predetermined threshold.

10. The media of claim 9, wherein the threshold is associated with a maximum resource load, a minimum resource maximum capability, a current bit rate, or a max bit rate.

11. The media of claim 6, wherein determining the status of the plurality of content delivery networks includes receiving a cache node status for a plurality of cache nodes in the service region.

12. The media of claim 6, wherein determining the status of the plurality of content delivery networks includes determining an overall remaining capacity for at least one of the plurality of content delivery networks for the service region.

13. A network element, comprising:
    a processor;
    a memory element; and
    a content delivery network module, wherein the network element is configured to:
    receive a request for content from a source in a network;
    determine a geographic service region for the source;
    creating a list of a plurality of content delivery networks in the geographic service region;
    determine the plurality of content delivery networks that each have a plurality of service nodes in the geographic service region, wherein each of the service cache nodes are configured to deliver the requested content, wherein at least one of the plurality of content delivery networks has more than one service cache node in another geographic service region, wherein at least one of the plurality of content delivery networks includes one or more service cache nodes that are not configured to deliver the requested content;

determine a status of each of the plurality of content delivery networks, wherein the status is based, at least in part, on an aggregate status of the content delivery network for the service region and a use cost of the content delivery network for the service region;

removing impaired content delivery networks from the list;

determine a status of each service node for each plurality of content delivery networks in the service region, wherein the status is provided by the content delivery network associated with the status, wherein the status indicates a resource load and availability of each service cache node, wherein the status is indicative of at least whether the service node is active or impaired; and select a particular one of the content delivery networks having a corresponding status as active to service the request for content.

14. The network element of claim 13, further comprising:
a location service module configured to determine a location of the source, wherein the service region is determined based, at least in part, on the location of the source.

15. The network element of claim 13, further comprising:
a network proximity service module configured to determine a network path for accessing the content.

16. The method of claim 1, wherein the aggregate status of the content delivery network for the service region includes the status of the plurality of service cache nodes related to the content delivery network in the geographic service region.

17. The method of claim 1, wherein a location of the service cache nodes is determined using an internet protocol subnet to location mapping table.

18. The method of claim 17, wherein the status of the content delivery network is aggregated by physical location of the service cache nodes.

19. The method of claim 18, wherein a latitude/longitude of the source is used to determine the geographic service region for the source.

* * * * *